United States Patent [19]

Higgins et al.

[11] Patent Number: 4,773,093
[45] Date of Patent: Sep. 20, 1988

[54] TEXT-INDEPENDENT SPEAKER RECOGNITION SYSTEM AND METHOD BASED ON ACOUSTIC SEGMENT MATCHING

[75] Inventors: Alan L. Higgins, San Diego; Robert E. Wohlford, Poway, both of Calif.

[73] Assignee: ITT Defense Communications, Nutley, N.J.

[21] Appl. No.: 687,625

[22] Filed: Dec. 31, 1984

[51] Int. Cl.⁴ .............................. G10L 5/00
[52] U.S. Cl. ...................................... 381/42
[58] Field of Search ................... 381/42, 43

[56] References Cited

U.S. PATENT DOCUMENTS

| | | | |
|---|---|---|---|
| 3,509,280 | 4/1970 | Jones | 179/1 |
| 3,673,331 | 6/1972 | Hair et al. | 179/1.5 B |
| 3,989,896 | 11/1976 | Reitboeck | 179/1.5 B |
| 4,403,114 | 9/1983 | Sakoe | 179/1.5 D |

FOREIGN PATENT DOCUMENTS 1179029 1/1970 United Kingdom .

Primary Examiner—Emanuel S. Kemeny
Attorney, Agent, or Firm—Robert A. Walsh; Thomas N. Twomey; Mary C. Werner

[57] ABSTRACT

The invention provides a method and system for speaker enrollment, as well as for speaker recognition. Speaker enrollment creates for each candidate speaker a set of short acoustic segments, or templates, of phonemic duration. An equal number of templates is derived from every candidate speaker's training utterance. A speaker's template set serves as a model for that speaker. Recognition is accomplished by employing a continuous speech recognition (CSR) system to match the recognition utterance with each speaker's template set in turn. The system selects the speaker whose templates match the recognition utterance most closely, that is, the speaker whose CSR match score is lowest. The method of the invention incorporates the entire training utterance in each speaker model, and explains the entire test utterance. The method of the invention models individual short segments of the speech utterances as well as their long-term statistics. Both static and dynamic speaker characteristics are captured in the speaker models.

3 Claims, 1 Drawing Sheet

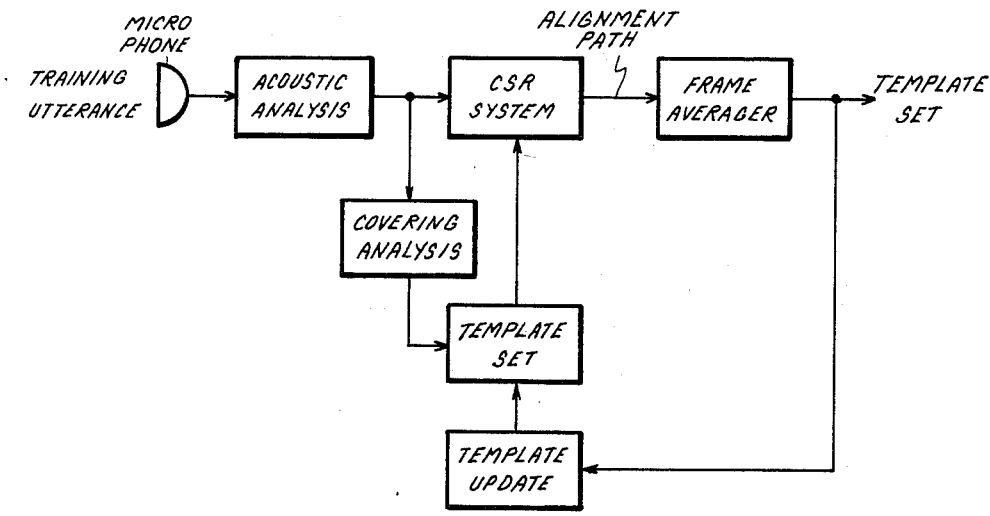
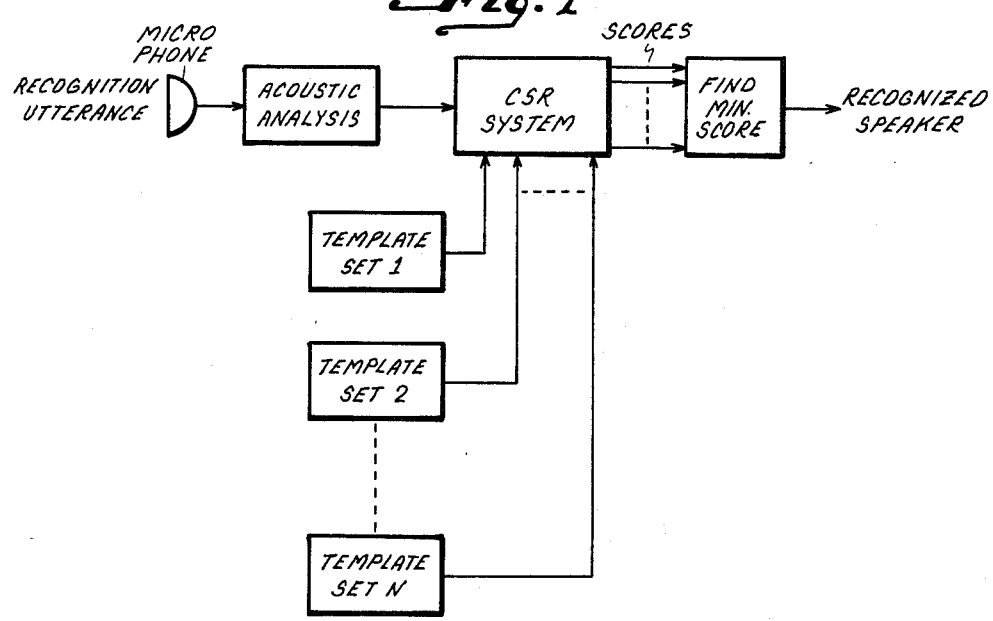

TEXT-INDEPENDENT SPEAKER RECOGNITION SYSTEM AND METHOD BASED ON ACOUSTIC SEGMENT MATCHING

The invention relates to a system and method for automatically recognizing the speaker of an arbitrary utterance from a group of candidate speakers.

Known automatic speaker-recognition systems require that a sample from each candidate speaker, known as a training utterance, be available prior to recognition. Such systems represent speech utterances in parametric form, for example, as samples of the acoustic spectrum in short intervals called frames. Such systems then compare the recognition utterance with each speaker's training utterance.

Known methods of comparison fall into two categories: probabilistic methods and minimum-distance methods. The probabilistic methods estimate the conditional probabilities of the observed recognition utterance given that it was spoken by each candidate speaker. The recognized speaker is the speaker for whom the conditional probability is greatest. The minimum-distance methods assume that speaker differences between any two speech samples can be characterized by a distance function of measurements of the samples. These methods compute the distance between the recognition utterance and each speaker's training utterance. The recognized speaker is the speaker for whom this distance is smallest.

The probabilistic methods can be further classified into parametric and nonparametric methods. The parametric methods assume that a model exists for the probability density function of speech, and that only a set of parameters of the model need to be identified. Nonparametric methods do not assume that the probability density function of speech is of a particular mathematical form.

A major difficulty with parametric methods is that the probabilistic models they employ are not realistic. The most widely-used model is the multivariate Gaussian probability density function. This function has been used because its properties are well understood and because of computational considerations, not because of its adequacy as a speech model.

The most widely-used nonparametric method is the nearest-neighbor method. This method uses samples from the training utterances to estimate each speaker's conditional probability density in the vicinity of the recognition utterance. A shortcoming of nonparametric methods is that they require lengthy utterances for both training and recognition.

A major difficulty with minimum-distance methods is the choice of distance functions. One function that several investigators have used is the weighted Euclidean distance between the sample means of the speech utterances, where the weight matrix is the inverse sample covariance matrix obtained from the training material. Although this function is sensitive to differences in the speakers of the utterances, it is equally sensitive to factors unrelated to speaker identity, such as text material and channel shape. Since this method uses only the long-term speech statistics, it cannot take advantage of speech dynamics that may be characteristic of individual speakers.

Text-dependent speaker recognition systems are known. In a training session, each user donates templates of all words in a limited vocabulary, which might be, for example, the ten digits. The user is prompted to utter a phrase consisting of words from the limited vocabulary. A continuous speech recognition (CSR) system matches the phrase using in turn each user's template set. The user whose template set gives the lowest phrase-match source is recognized.

For text-independent speaker recognition, a major difficulty is not that the text of the utterance is unknown, but that the vocabulary is unlimited. Because of the unlimited vocabulary, it is impossible for users to donate templates for all of the words, or even a significant subset of the words, that could be encountered in a test utterance. However, if templates are derived from units smaller than words, such as acoustic segments of phonemic duration, it may be possible to cover a short test utterance using templates extracted from a short training utterance. The approach of the invention is to derive a set of short, sub-word templates from each user's training material, and to match the test utterance with each template set using a CSR system. Whereas the text-dependent method matches only the long-term statistics of the test and training utterances, the method of the invention attempts to match every segment of the test utterance with a segment stored from the training utterance. Uniformity from speaker to speaker of the covering provided by the template sets enhances the performance of a system employing the method of the invention.

The invention provides a method and system for speaker enrollment, as well as for speaker recognition. Speaker enrollment creates for each candidate speaker a set of short acoustic segments, or templates. An equal number of templates is derived from every candidate speaker's training utterance. A speaker's template set serves as a model for that speaker. Recognition is accomplished by employing a continuous speech recognition (CSR) system to match the recognition utterance with each speaker's template set in turn. The system selects the speaker whose templates match the recognition utterance most closely, that is, the speaker whose CSR match score is lowest.

Unlike previous nonparametric nearest-neighbor methods, the method of the invention incorporates the entire training utterance in each speaker model, and explains the entire test utterance. In this sense it makes efficient use of the available data, and therefore avoids the requirement for lengthy utterances. Compared with minimum-distance methods, the method of the invention has the advantage that it models individual short segments of the speech utterances as well as their long-term statistics. Therefore, both static and dynamic speaker characteristics are captured in the speaker models, resulting in greater accuracy than known methods.

The principles of the invention may be better understood from a reading of the following description in accordance with the drawings in which:

FIG. 1 is a diagram of the speaker recognition system; and

FIG. 2 is a diagram of the speaker enrollment system.

The operation of the invention may be better understood by reference to the keyword recognition system as disclosed in copending U.S. application Ser. No. 655,958, filed Sept. 28, 1984 of A. L. Higgins et al., assigned to ITT Corporation and incorporated herein by reference. The templates used as a speaker model in the invention are related to the filler templates that are used as a language model in the keyword recognition system, in that both are designed to match arbitrary speech utterances with minimal sensitivity of the match score to the text of the utterances. However, the speaker-recognition templates are specifically designed to represent the speech of a particular speaker.

Both the speaker-enrollment and recognition parts of the system employ a CSR system to match continuously-spoken speech with a set of templates. The CSR system determines both the sequence of templates and the alignment of template frames with speech input frames that minimizes a measure of distance between the aligned frames. The CSR system does not apply any syntactic constraints to limit the allowable sequences of templates, and only the best-matching template sequence is required to be computed. For speaker enrollment, the CSR system must supply for every frame of the input utterance a pointer to the frame of the template to which it is matched. For recognition, the CSR system must supply the phrase-match score, averaged over all pairs of matching input and template frames. The particular CSR algorithm is not critical, and the invention can employ any of a number of existing CSR systems, such as those disclosed in copending U.S. applications Ser. Nos. 439,422, filed Nov. 3, 1982 of G. Vensko, et al., and 473,422, filed Mar. 9, 1983 of G. Vensko, et al., both commonly assigned to ITT Corporation and incorporated herein by reference.

A block diagram of the recognition system is shown in FIG. 1. Input speech from the microphone is provided to the input of an acoustic analyzer, which divides the speech into short frames and provides as its output a parametric representation of each frame. The particular type of acoustic analysis performed by the analyzer is not critical to the invention, and known acoustic analyzers may be employed such as that disclosed in the aforementioned Vensko, et al. and Higgins, et al. applications.

The parametric representation of the test utterance is applied as input to the CSR system. The CSR system matches the test utterance to each speaker's template set, obtained during speaker enrollment. The result of each match is a match score for that speaker. The match scores for all the candidate speakers are the output of the CSR system as shown in FIG. 1. These scores are searched to find the minimum, and the corresponding speaker is recognized. Matching to the different speaker's template sets can be done either sequentially or simultaneously. If done simultaneously, the CSR system must employ a syntax to ensure that concatenated templates belong to the same speaker's template set.

A block diagram of the speaker-enrollment system is shown in FIG. 2. Although it is functionally separate from the recognition system, the two systems can use for the most part the same physical components (microphone, acoustic analyzer, CSR system). The input to the enrollment system is a training utterance and the output is a template set or speaker model to be used in recognition. The system creates an initial set of templates from a covering analysis of the training utterance. A description of such a covering analysis is given in the aforementioned Higgins, et al. application. Briefly, the covering analysis divides the input speech into sub-word units, which are short, equal-length segments, and selects a subset of the segments that represents, or covers, the input speech. The initial template set thus formed serves as a starting point for a series of iterations performed by the enrollment system, in which the templates are successively improved.

The first step in an iteration is to match the templates with tne input speech using the CSR system. The CSR system provides different information in the enrollment system than in recognition. In enrollment, the CSR system labels the training utterance in the following sense. Each template frame is aligned with one (or possibly two) frames of the training utterance. The training utterance frames are labelled by the template frames to which they are aligned. This labelling information is passed to the frame averager, which averages together all the training utterance frames that were aligned with each template frame. This is the second step in the iteration. The final step is to replace each template frame by the corresponding average of training utterance frames. Once this is completed, another iteration begins using the new templates. After some number of iterations, such as three, the computation is done, and the most recent template set is saved as the speaker model.

The iterative computation described above is an implementation of the classical K-Means clustering algorithm. Other implementations can be used as well. The purpose of clustering in the invention is to obtain a set of templates that matches the modes of the speaker's acoustical space. The covering analysis shown in FIG. 2 provides an initial condition for the clustering analysis. It is possible to remove the covering analysis from the enrollment system and to use instead a fixed set of initial templates obtained prior to enrollment. To obtain these fixed initial templates, the covering analysis described earlier is applied to the combined speech of many speakers. The result is a single speaker-pooled template set that is stored in memory to be used as the initial condition for enrolling all speakers. We have found this modification of the invention to give slightly improved accuracy for very short recognition utterances.

As an example, 50 templates can be used per speaker, where each template is 8 frames, or 80 milliseconds, in duration. In general, the templates for one speaker need not all be of the same duration. The choice of the number and duration of templates should be influenced primarily by the durations of the available training and recognition utterances.

As an example of a forensic application, the invention can be used to match the voice of an unknown person with the voices of known suspects. The invention can also be used to match the voices from two lists of unknown people, such as telephone terrorists. Another application of the invention is for automatically identifying the sender of voice mail messages. A voice mailing system could be augmented with the capability of allowing users to screen their calls for messages from selected senders. The invention can also be used for conversational labelling. In creating a transcript of a conversation involving several known participants, the invention can be used to ascribe the speaker of each utterance. As a still further example, by comparing the CSR match scores or a function of the CSR match scores with a threshold, the invention can be used for text-independent speaker verification. The following is an example of how such a capability could be used. Because of its higher accuracy, text-dependent verification would normally be used to gain access to a secure voice terminal. However, text-independent verification can be used to ensure that the speaker remains the same after access is granted.

While the present invention has been described in connection with a preferred embodiment thereof, it is to be understood that additional embodiments, modifications, and applications which will become obvious to those skilled in the art are included within the spirit and scope of the invention as set forth by the claims appended hereto.

We claim:

1. A speaker recognition system for automatically recognizing a given speaker from a group of enrolled speakers where said system can select a given enrolled speaker from said other enrolled speakers, comprising:
enrollment means including first acoustic analysis means for enabling each speaker to provide an input speech training utterance for converting said input speech utterance into frames of equal duration by providing at an output a parametric representation of each frame,
covering analysis means coupled to said output of said acoustic analysis means for dividing said parametric representation to shorter, equal length segments indicative of sub-word units and providing at an output a subset of said segments that represent said training utterance, with said subset of segments representing an initial template set for each enrolled speaker, template storage means for storing said initial template set,
aligning means coupled to said template set storing means for aligning each template frame with at least one frame of said input speech utterance to provide a label for each utterance frame as aligned with a template frame,
frame averaging means coupled to said aligning means for averaging all input speech utterance frames that were aligned with each template frame,
template update means coupled to said frame averaging means and said template set storing means to replace each template set as stored with the corresponding average of said utterance frames to provide a new set of stored templates,
recognition means including second acoustic analysis means for enabling a speaker to be recognized to speak and for dividing said speech into said equal duration frames by providing at an output a parametric representation of each frame, and means for matching said new set of stored templates for each enrolled speaker with said parametric representation of each frame to provide at an output a match score for each enrolled speaker and means responsive to the minimum match score to identify said one of said enrolled speakers who is speaking.

2. A method for recognizing one speaker in a group of enrolled speakers, comprising the steps of:
enrolling each speaker by having each speaker speak a training utterance,
converting said training utterance into speech frames of equal duration each indicative of a segment of said utterance,
dividing said speech frames into shorter equal duration segments each indicatvie of a segment of said utterance,
forming a set of templates from said shorter equal duration segments,
storing said template set,
aligning each of said stored templates with at least one frame of said training utterance for each speaker averaging said aligned frames,
forming a new set of templates from said averaged frames,
storing said new set of templates for enabling a comparison of the speech of any arbitrary enrolled speaker with said new set of templates as stored to recognize said arbitrary speaker from any other enrolled speaker.

3. The mehtod according to claim 2, further including the step of:
recognizing an arbitrary speaker by allowing said speaker to speak and dividing said input speech into equal length frames and comparing said frames with said new set of templates for each enrolled speaker and,
selecting the enrolled speaker providing a best match with said new set of templates as stored.

* * * * *